Nov. 1, 1966   C. J. RODMAN ETAL   3,282,769
APPARATUS FOR MAKING COMPOSITE COREBOARD
Original Filed Jan. 14, 1963   3 Sheets-Sheet 3
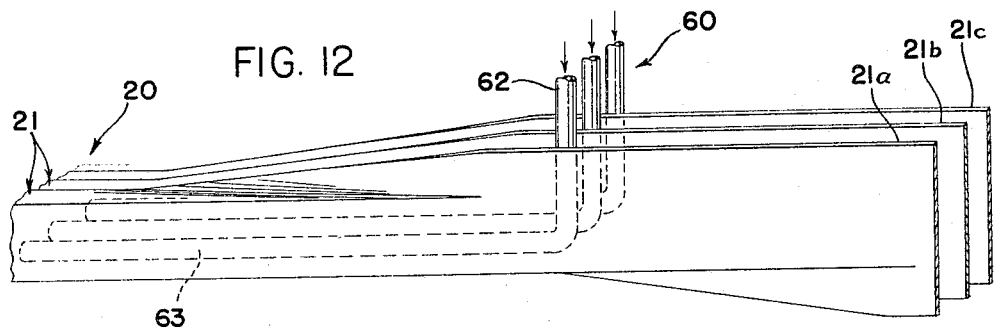
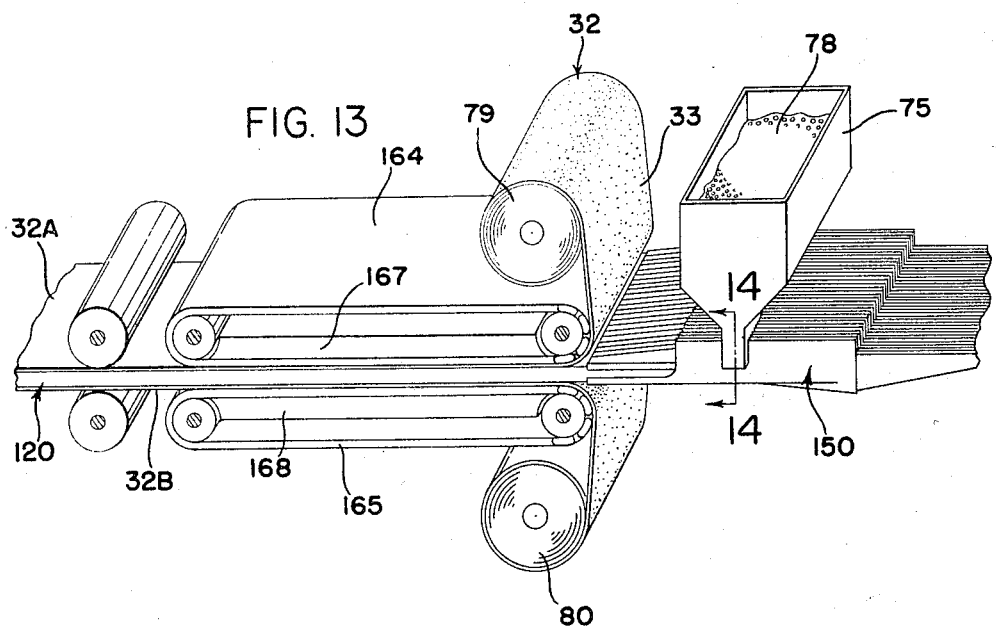
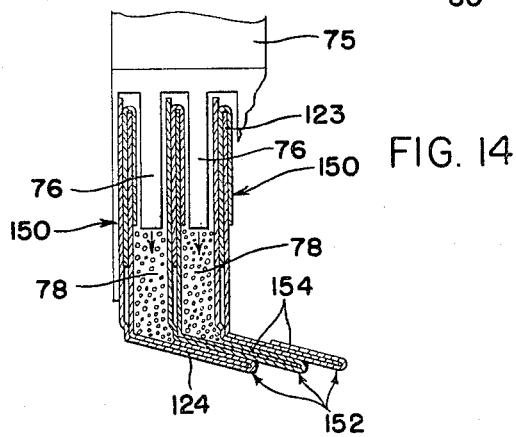
INVENTORS.
CLARENCE J. RODMAN &
THORNE K. BROOME
BY Hamilton & Cook
ATTORNEYS

United States Patent Office 3,282,769
Patented Nov. 1, 1966

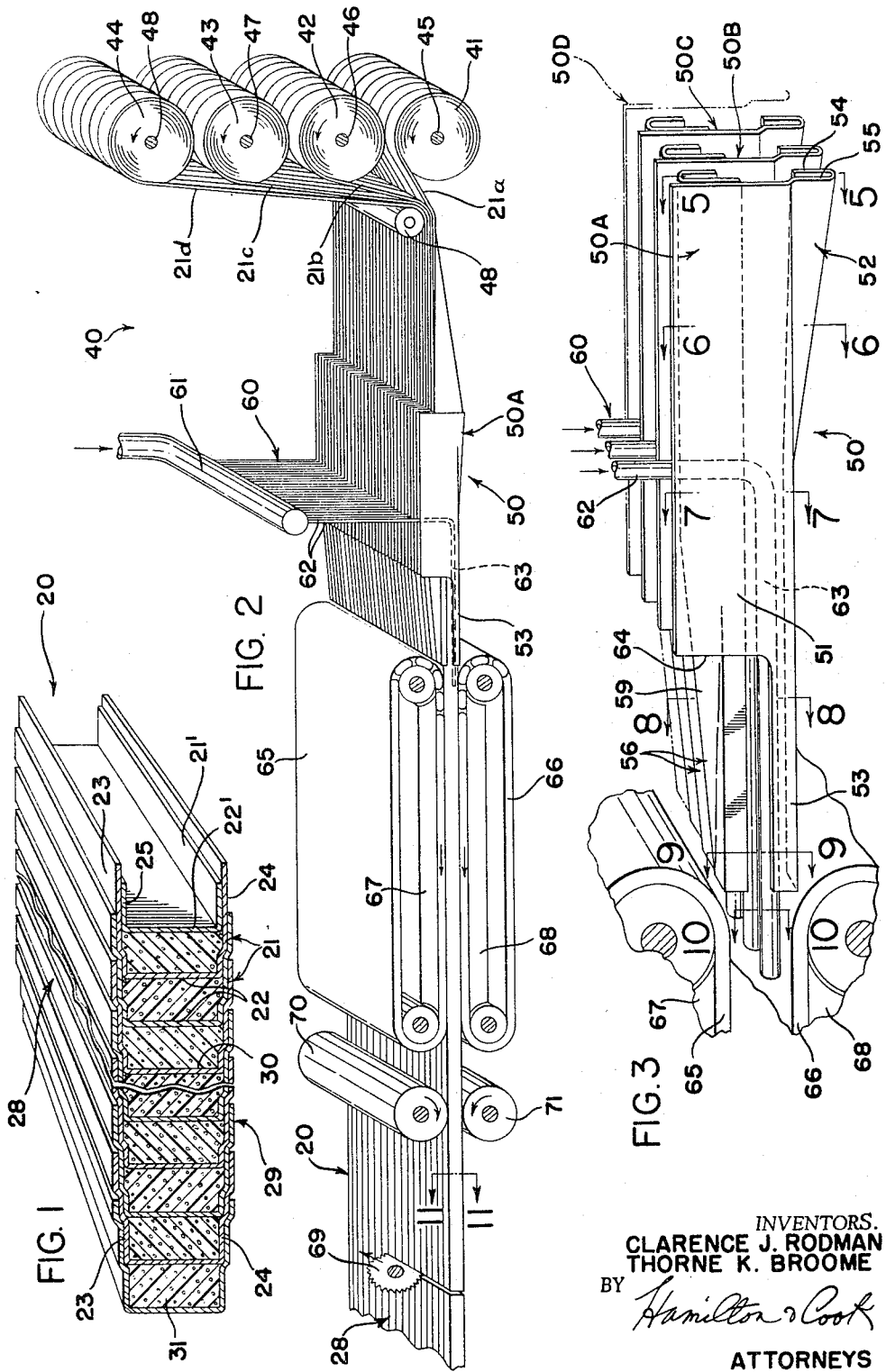

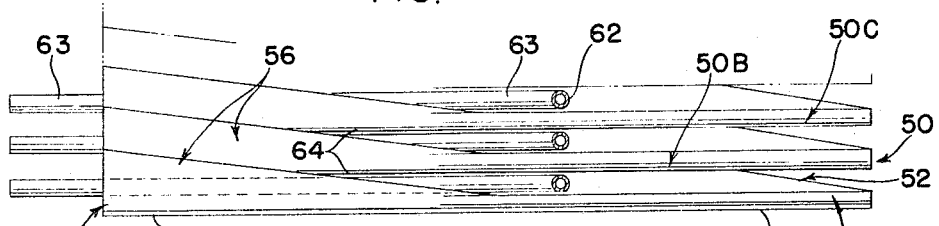
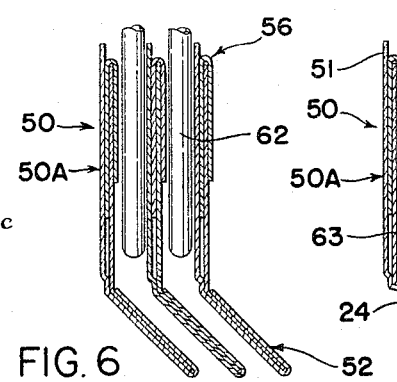
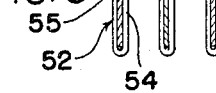
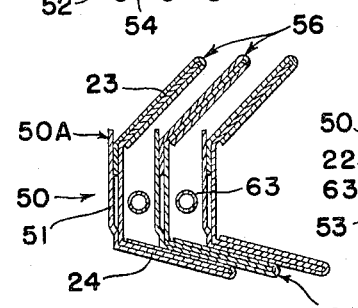
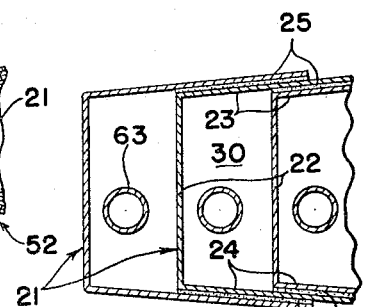
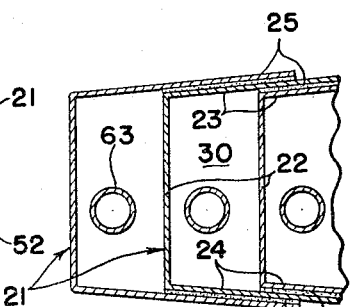
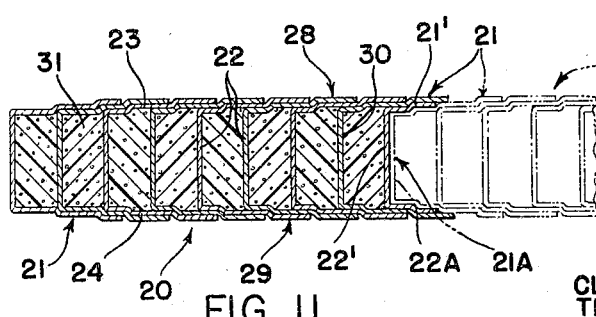

3,282,769
APPARATUS FOR MAKING COMPOSITE COREBOARD
Clarence J. Rodman and Thorne K. Broome, Alliance, Ohio, assignors of one-half to C. J. Rodman, doing business as Alliance Tool Company
Original application Jan. 14, 1963, Ser. No. 251,096, now Patent No. 3,185,611, dated May 25, 1965. Divided and this application Feb. 23, 1965, Ser. No. 440,987
4 Claims. (Cl. 156—461)

This application is a divisional application of our U.S. Patent No. 3,185,611, which issued on May 25, 1965.

The present invention relates to a composite structure. More particularly, the present invention relates to a composite coreboard having opposed homogeneously interconnected skins separated by a light weight core. Specifically, the present invention relates to a composite coreboard characterized by its light weight, its rigid high strength and its excellent insulative characteristics.

Coreboards and the art of making such boards is becoming more and more important as the cost of building materials continues to soar in tempo with the ever increasing labor scale.

Heretofore, the construction of coreboards could have been classified as being one or the other of two types—sandwich or honeycomb. Both types have comprised combining two major constituents in an attempt to compensate between high structural strength and lightness of weight.

One of the two constituents is referred to as the "core" and is generally a cellular plastic, such as foamed polystyrene, foamed cellulose acetate and the like. The core of cellular plastic provides high insulative qualities, both as to heat and sound, and can be made with a relatively low density on the order of two or more pounds per cubic foot, and still retain sufficient rigidity to maintain its shape. However, such material is far too frangible to be satisfactory as a load bearing structural component.

The second constituent is referred to as the "skin" or "reinforcement."

In sandwich constructions, the skins are laminated onto the outer surfaces of the core. These skins generally comprise relatively thin sheets of high strength material and provide a relatively simple means for imparting strength to the sandwich board. In an attempt to acquire the desired strength, particularly in the direction perpendicular to the surface of the skin, the skin and core of the sandwich structure are bonded together. There is however, a tendency for the skins to separate from the core at the bond. This separation is not just because the difference in the composition of the materials used to make the skin and core prevents a complete joinder, but also because of the stress concentration inherent at the joinder of two materials having such a disparity of strengths when the composite coreboard is subjected to bending or sheer loadings. Moreover, in view of the desirability to use thin walled skin in order to maintain the requisite low weight of the coreboard, that skin which is subjected to compressive stresses during bending of the boards is highly subject to buckling. This is prevented solely by the bond existent between the skin and the core. Accordingly, if tthe bond withstands the tendency to separate, a portion of the compressive stress will be required to be carried by that portion of the core adjacent the skin. When this loading exceeds the compressive stress suportable by the low strength core material, there is a separating, or delaminating action, of the core material, either between the skin and the core or parallel thereto, causing failure of the board.

One can not increase the thickness of the skin in order to provide an additional cross sectional area sufficient to prevent loading of the core, as this would defeat the prime purpose of coreboard by making it unnecessarily heavy and costly.

A composite board of the honeycomb variety is really a combination of a honeycomb board, such as the well-known corrugated board and the like, in which the interstices, or voids, between the honeycombed members are filled with a cellular material. While there is some modicum of increased strength over the non-composite honeycomb board incident to the composite nature of the structure, the addition of the core material is primarily to provide the additional insulative qualities attributable thereto.

The strength of the composite honeycomb board in sheer and bending is also directly proportionate to the bond between the latticed interior and the surface skin. This slight increase in the strength of the composite honeycomb board as compared to the composite sandwich board has not been sufficient to justify the increased cost of material and labor required to manufacture the intricate internal lattice of the honeycomb variety of composite board.

It is therefore an object of the present invention to provide a composite board which has greatly increased strength over either the sandwich or honeycomb type composite boards known to the prior art and yet is very light in weight.

Another object of the present invention is to provide a composite coreboard in which the skins forming the opposed sides thereof are homogeneously interconnected so that the skins can support severe bending loads independently of the bond between the skin and the core.

It is also an object of the present invention to provide a composite coreboard in which the opposed and separated skins are so efficiently interconnected that flexible, relatively inexpensive materials can be used to impart adequate structural strength to the board.

It is a further object of the present invention to provide a composite coreboard one edge of which can be so joined to the edge of an adjacent board as to provide unbroken structural continuity therewith and thus preclude weakness at the joint.

It is a still further object of the present invention to provide a method for manufacturing composite coreboard, as above.

It is a still further object of the present invention to provide an uncomplicated and inexpensive apparatus for manufacturing this improved composite coreboard.

These and other objects which will become apparent from the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Referring to the drawings:
FIG. 1 is a perspective view of the improved coreboard;
FIG. 2 is a schematic representation, in perspective, of apparatus for making the improved composite board;
FIG. 3 is an enlarged portion of FIG. 2 in slightly different perspective and with the lead-off strips deleted;
FIG. 4 is a top plan of a portion of FIG. 3;
FIG. 5 is an enlarged cross section taken substantially on line 5—5 of FIG. 3;
FIG. 6 is an enlarged cross section taken substantially on line 6—6 of FIG. 3;
FIG. 7 is an enlarged cross section taken substantially on line 7—7 of FIG. 3;
FIG. 8 is an enlarged cross section taken substantially on line 8—8 of FIG. 3;

FIG. 9 is an enlarged cross section taken substantially on line 9—9 of FIG. 3;

FIG. 10 is a further enlarged cross section taken substantially on line 10—10 of FIG. 3;

FIG. 11 is an enlarged cross section taken substantially on line 11—11 of FIG. 2;

FIG. 12 is a schematic representation, also in perspective, and similar to FIG. 2, depicting the folding of the skin element strips as they pass through the apparatus represented in FIG. 3;

FIG. 13 is a schematic representation, also in perspective, and similar to FIG. 2, depicting a modified version of an apparatus of making the improved coreboard; and, FIG. 14 is a cross section taken substantially on line 14—14 of FIG. 13.

In general, a composite coreboard according to the present invention, indicated generally by the numeral 20, comprises a series of skin elements having a generally channel-shaped cross section which are nested together to form longitudinal cells between the spaced apart webs of the channel-like skin elements. The corresponding flanges of the nested channel-like skin elements are bonded together to form the opposed surfaces of the board, and the cells are filled with a light weight core material, preferably a cellular plastic.

The subject composite coreboard is preferably manufactured by the process of aligning a plurality of flat strips of skin material in side-by-side spaced relationship and folding a portion of each said strip along one side so that the folded portion overlaps the corresponding folded portions of a successive plurality of adjacent strips. A measured amount of core material is fed into the voids between adjacent strips formed by the remaining side-by-side spaced apart portions of the strips and the overlapping folded portions thereof. A portion of the other edge of each said strip is similarly folded into overlapping relationship with the edges of the successive adjacent strips. Both overlapping folded portions are bonded together to form the spaced apart outer surfaces, or sides. This results in the board having homogeneously joined, spaced apart skins. That is, the folded portions forming the skins are joined by the remainder of each skin element extending laterally between the folded portions.

Referring particularly to FIG. 1 of the drawings, the skin elements 21 of board 20 may be formed from flexible paper, foil, metal, Fiberglas or materials of similar flexibility and structural strength. Each element 21 has a substantially channel-shaped cross section with a web 22 and spaced apart flange portions 23 and 24. Successive channel-shaped skin elements 21 are partially nested so that the flange portions 23 and 24 overlie the substantial portion, preferably about one half, of the corresponding flange portions of successive elements 21a, 21b, 21c, etc.

For the most efficient results it has been found that the successive elements should be nested sufficiently that the distance between adjacent web portions 22 is approximately one third to one fourth the distance between flange portions 23 and 24.

The flange portions of each element 21 are bonded to the respective flange portions of the successive elements 21 which they overlie, as by an adhesive 25. The thus mounted flange portions 23 form one side, or skin, 28 of the board 20 and the bonded flange portions 24, form a second side, or skin 29. By nesting and bonding the skin elements 21 together in this fashion, a series of longitudinal rectilinear cells 30 are formed. Each cell is bounded on two sides by adjacent webs 22 and on the other two sides by the opposed spaced apart skins 28 and 29. The cells 30 are filled with a light weight insulative material, defined as the core 31. The core material is a light weight material having excellent heat and sound insulative characteristics which is sufficiently rigid to maintain the webs 22 in spaced relation and laterally oriented between the skins 28 and 29. However, though the core material must be sufficiently rigid to maintain the desired orientation of the webs, it need not have high strength. Such cellular plastics as the rigid but frangible foamed phenolics plastics, urethane and polystyrene may be used with excellent results.

In prior known coreboard constructions utilizing such core material the bond betwen this core material and the other skin was of paramount importance. To this end, the interior surfaces of the skin were required to be purposely roughened or were required to be treated with a special primer to effect the mandatory bond. However, even when the interior skin surfaces were roughened or a primer applied, there remained a distinct tendency for the board to fail at the bond under bending or sheer loads, as hereinbefore desired.

The composite coreboard 10 disclosed herein, to the contrary, will not so fail. For example, when the board 10 is subjected to a bending load and one of the flange portions is subjected to the incident compressive stress, that flange is not prevented from buckling merely by the bond between that flange and the core, as is the situation of the prior art coreboard constructions. The opposed surface skins 28 and 29 of the board 20 are homogeneously joined together by the webs 22 which are integral with the flange portions 23 and 24 forming the skins. Therefore, under a compressive load applied to either skin, that skin is restrained from buckling by its unitary connection with the web. At the same time, when the opposed flange portion is subjected to tensile stress the unitary connection of that flange to the web distributes the tensile stress into the web as well. In summary, the channel-shaped skin elements 21 act as a series of beams when incorporated in the composite board 20. When these skin elements 21 are nested and bonded together with the voids therebetween filled with a light weight, frangible cellular plastic, as disclosed supra, the board will withstand a greater load than the summation of the load supportable by the individual channel-shape skin elements.

The outer surface of either skin 28 or 29 may be enhanced by applying a decorative overlay 32 thereto, as shown in FIG. 13. Thus overlap may be applied to both skins 28 and 29, as by an adhesive material 33, therebetween.

Composite board 20 also has the advantage of being capable of joinder with other similar boards without incurring a decrease in the structural strength along the joint. Such a joinder is best seen in FIG. 11. The board 20 is depicted as being joined to a similar board 20A, represented in phantom. The end element 21A and board 20A is full nested into the open end of the last element 21' of board 20 so that the webs 22' and 22A are in juxtaposition. A suitable adhesive joins the abutting surfaces of elements 21' and 21A of boards 20 and 20A, respectively, to complete the joinder of the boards.

The improved composite board can be readily fabricated in a device of the type shown in FIG. 2 and indicated generally by the numeral 40.

A plurality of feed rolls 41 are journaled for rotation on mounting shaft 45 and a plurality of rolls 42–44 are similarly journaled on shafts 46–48, respectively. Each roll 41–44 comprises the wound, flat, flexible, ribbon-like material from which are formed the skin elements 21. In the embodiments pictured, the mouuting shafts 45–48 are arranged in vertically stacked spaced relationship so that all the rolls on each shaft will be aligned with a corresponding roll on each of the other shafts. In this way the lead-offs of the material from which are formed skin elements 21 from rolls 41–44 will pass around the orienting roll 48 in stacked relation. For clarity, these lead-offs are designated 21a–21d, respectively. To prevent entangling of the skin element lead-offs as they are turned through 90° about their longitudinal axis between the orienting roller 48 and the forming guides 50, the leads 21a–21d are fit into successive guides 50. That is, the skin element lead-off 21a emanating from roll 41 mounted on shaft 45 and comprising the outermost of the four elements passing around orienting roller 48 turns clockwise about its longitudinal axis to enter the nearest guide 50A, as viewed in FIG. 2. Skin element lead-off 21b emanating from the correspondingly aligned roll 42 mounted on shaft 46 is the next lead inwardly of lead 21a passing around orienting roller 48 and it too rotates clockwise about its longitudinal axis between roller 48 and the next successive guide 50B inwardly of guide 50A. The succeeding skin element lead-offs 21c and 21d are progressively fed into respective guides 50C and 50D, and so on progressively across the width of the apparatus.

Each of the guides 50 is comprised of a backing portion 51 which terminates at its lower extremity in a lower finger portion 52 extending below and laterally offset from the backing portion 51. The lower finger portion 52 may be unitary with backing portion 51 and connected thereto by a lateral bridge 53. The lower finger portion 52 comprises spaced apart and generally parallel engaging elements 54–55, joined at one end in the general shape of a U. The guide 50 also has an upper finger portion 56. The upper finger portion 56 similarly comprises spaced apart, generally parallel, engaging elements 58 and 59 which are in the shape of an inverted U, opposed to, aligned with and spaced apart from the lower finger portion 52. The flat, ribbon-like strips of the material from which the skin elements 21 are formed are threaded into the open portion of these U-like finger portions. As shown in FIG. 5, the engaging elements 58 and 59 of the upper finger portion 56 engage a corresponding portion of the flat, ribbon-like skin element lead-off 21a–21d therebetween and the engaging elements 54 and 55 which form the opposed U shaped lower finger portion 42 engage a corresponding portion of the lead-offs therebetween.

The lower finger portion 52 is progressively turned out of alignment with the upper finger portion 56, as depicted in FIG. 6, until it lies substantially perpendicular to the plane of the backing portion 51. As represented in FIG. 7, the orientation of the lower finger portion 52 cannot exactly be perpendicular to the plane of the backing portion 51 because of the engagement of the finger portions with those on adjacent guides 50.

A plurality of charging tubes 60 communicating with a common feed manifold 61 are so constructed and arranged that one charging tube 60 extends into the space between successive guides 50 and terminates in that area between the spaced apart upper and lower finger portions 52 and 56, respectively. In the preferred embodiment, each charging tube 60 has a vertically oriented entry portion 62 and an elongated horizontally oriented spout portion 63 as more fully hereinafter described.

Beyond the insertion point of the entry portion 62 of charging tube 60, the upper finger portions 52 are also progressively turned toward a substantially perpendicular disposition with respect to the backing portion 51 until the guides 50 have substantially formed the channel-shaped skin element 21. See FIGS. 8 and 9.

As shown in FIG. 3, the backing plates 51 must be relieved, as at 64, to permit the required turning of the upper finger portions on the adjacent guides. This figure also discloses that spout portion 63 of each charging tube 60 may extend beyond the end of the guides 50 into the now nested skin elements 21. These elements are charged through spout portion 63 with a metered amount of foamable plastic material which is permitted to expand and fill the cells 30 between these successively nested elements 21. At this point the skin elements 21 appear as disclosed in FIG. 10.

Opposed forming and transporting means comprising upper and lower belts 65 and 66, respectively, engage the nested skin elements as they leave the guides 50. Upper and lower heating means, or platens 67 and 68, are positioned within the run of belts 65 and 66, respectively, to apply heat to the nested elements 21 as they pass between the belts. This heat is applied primarily to set the layer of thermosetting adhesive 25 of which one side, now the inner side, of the channel-shaped elements 21, are supplied. This adhesive material affords the bond between the overlapping flanges 23 and 24 of the nested elements 21 of the board.

The pressure of the belts will tend to form a flush outer surface on each of the skins 28 and 29 of the board. However, an even smoother exterior may be secured by providing a pair of opposed controllable pressure, pinch rolls 70 and 71 at the end of the belts.

An endless sheet of the composite coreboard 20 can be produced in this fashion, which, for handling ease, may be cut into desirable lengths by a flying saw 69.

An alternative form of the apparatus is disclosed in FIGS. 13 and 14. This embodiment is particularly adapted for manufacturing the coreboard in which the core material is inserted in powdered or granular form rather than in the liquid form of a foamable material. In this embodiment a hopper 75 is positioned over the guides 150 and a series of shoots 76 extend from the base of the hopper such that one extends into each space between adjacent guides 150 at a location equivalent to the insertion point of the entry portion 62 of charging tubes 60. The powder, or beads, 78 constituting the granular core material pass from the hopper 75 through shoot 76 into the area between adjacent guides 150. When used in conjunction with a feed hopper 75, the guides incorporate one basic change. That is, the guiding plates 154 which form one side of the lower finger portion 152 are relieved sufficiently, as shown in FIG. 14, to permit the movement of the flange portion 124 of skin elements take-off strip through the guide to frictionally engage the beads 78 being deposited thereon and thereby be carried along therewith. The cross sectional area of the discharge shoot 76 together with the speed at which the skin element take-off strip is moving and the distance to which the shoot 76 is inserted between the guides 150 meters an appropriate amount of the bead material 78 into the cavity between the guides 150. The upper portion of the skin element take-off strips are folded in the same manner as in the preferred apparatus and the nested skin elements are fed into the forming and progressing belt means 164 and 165 where they are also heated by platens 167 and 168. This heat not only bonds together the flange portions 123 and 124 of the skin elements 121 to form the skins on the board 120, but also joins together the myriad beads 72 forming the core so that they will not fall out of the board when it is completed.

The figures depicting the alternative embodiment also disclose that either, or both, an upper and lower decorative overlay 32A and 32B may be applied to the board. These overlays 32A and 32B are removed from rolls 79 and 80 respectively, and are also coated with a thermosetting adhesive 33 so that passage of the nested elements between the belts 164 and 165 also bond the desired overlay into position on the composite coreboard.

It is thus apparent that the subject invention provides a new and improved method and apparatus for manufacturing an improved composite coreboard.

What is claimed is:

1. Apparatus for making composite coreboard from flat, ribbon-like strips and a core material comprising, a plurality of supply rollers for discharging flat, ribbon-like, flexible strips, a plurality of side-by-side spaced apart turning guides, finger means on said guides for folding the edge portions of the strips emanating from said supply rollers into substantially channel-shaped in cross-section skin elements, said turning guides constructed and arranged to partially nest the skin elements formed in adjacent turning guides so as to provide longitudinal cell space between successive skin elements, charging conduit means to feed core material into said longitudinal cell spaces and forming and transporting means to bond together the nested skin elements.

2. Apparatus for making composite coreboard from flat, ribbon-like, flexible strips and a core material comprising, a plurality of supply rollers for discharging said flat, ribbon-like, flexible strips, a plurality of side-by-side spaced apart turning guides, each said turning guide having a backing plate and upper and lower folding finger means on said backing plates, said folding finger means being opposed, spaced apart and U-shaped in cross section for grasping the edge portions of a strip emanating from said rollers and progressively folding the edge portions of said strip into substantially channel-shaped cross section skin elements, said turning guides constructed and arranged to partially nest the skin elements formed in adjacent turning guides so as to provide a longitudinal cell space between adjacent skin elements, charging conduit means to feed core material into said longitudinal cell spaces and forming and transporting means to bond together the nested skin elements.

3. Apparatus for making composite corebord from flat, ribbon-like, flexible strips having a thermosetting adhesive on at least one side thereof and a core material comprising, a plurality of supply rollers for discharging said flat, ribbon-like strips, a plurality of side-by-side spaced apart turning guides, finger means on said guides for folding the edge portions of the strips emanating from said supply rollers into substantially channel-shaped in cross section skin elements, said turning guides constructed and arranged to partially nest the skin elements formed in adjacent turning guides so as to provide longitudinal cell space between said skin elements, charging conduit means to feed core material into said longitudinal cell spaces, upper and lower belt means for transporting the nested skin elements away from said turning guides and for applying pressure to the nested skin elements therebetween, and heating means within the run of said belt means for supplying the bonding heat to said nested skin elements.

4. Apparatus for making composite coreboard from flat, ribbon-like, flexible strips having a thermosetting adhesive material on at least one side thereof and a core material comprising, a plurality of stacked supply rollers for discharging said flat, ribbon-like strips, a plurality of side-by-side spaced apart turning guides, each said turning guide having a backing plate and upper and lower folding fingers on said backing plates, said folding fingers being opposed, spaced apart and U-shaped in cross section for grasping the edge portions of a strip emanating from a roller and progressively folding the edge portions of said strip into substantially channel-shaped cross section skin elements, said turning guides constructed and arranged to partially nest the skin elements formed in adjacent turning guides so as to provide longitudinal cell space between said skin elements, charging conduit means to feed core material into said longitudinal cell spaces, upper and lower belt means for transporting the nested skin elements away from said turning guides and for applying pressure to the nested skin elements therebetween, heating means within the run of said belt means for supplying the bonding heat to set the adhesive on said nested skin elements and an opposed pair of pressure pinch rollers for rolling a flush finish on the outer surface of said nested and bonded skin elements.

References Cited by the Examiner

UNITED STATES PATENTS

| 2,486,091 | 10/1949 | Adams et al. | 156—461 |
| 2,744,042 | 5/1956 | Pace | 161—161 |
| 2,956,310 | 10/1960 | Roop et al. | 156—79 |
| 2,998,501 | 8/1961 | Edberg et al. | 156—79 |
| 3,066,722 | 12/1962 | Adams et al. | 156—470 |
| 3,174,887 | 3/1965 | Voelker | 156—79 |

EARL M. BERGERT, *Primary Examiner.*

H. F. EPSTEIN, *Assistant Examiner.*